United States Patent [19]

Matsumura et al.

[11] Patent Number: 4,699,733
[45] Date of Patent: Oct. 13, 1987

[54] RESIN COMPOSTION FOR POROUS FILM AND FILM PREPARED THEREFROM

[75] Inventors: Shuji Matsumura, Aichi; Michiyasu Ito, Mie; Syoichi Tsuji, Aichi; Hisatosi Suzuki, Aichi; Syoichi Ito, Aichi, all of Japan

[73] Assignee: Mitsui Toatsu Chemicals, Inc., Tokyo, Japan

[21] Appl. No.: 940,377

[22] Filed: Dec. 11, 1986

[30] Foreign Application Priority Data

Dec. 11, 1985 [JP] Japan ................................ 60-276692

[51] Int. Cl.$^4$ .............................................. H01B 1/06
[52] U.S. Cl. ..................................... 282/521; 252/518; 264/41; 264/156; 264/288.8; 264/DIG. 73; 521/92; 521/143
[58] Field of Search .................. 252/518, 521; 264/41, 264/156, 288.8, DIG. 73; 521/92, 143

[56] References Cited

U.S. PATENT DOCUMENTS 4,347,844  9/1982  Ohki et al. .......................... 428/323

FOREIGN PATENT DOCUMENTS 2151538  7/1985  United Kingdom .

Primary Examiner—Morton Foelak
Attorney, Agent, or Firm—Sughrue, Mion, Zinn, Macpeak & Seas

[57] ABSTRACT

A porous film having a good water vapor permeability is obtained with a high productivity by melting a resin composition comprising 100 parts by weight of a polyolefin resin and 50 to 500 parts by weight of barium sulfate having an electric conductivity of 250 $\mu$S/cm or less in terms of the electric conductivity of a supernatant formed when the barium sulfate is added to water, and a particle size of 0.1 to 7 $\mu$m, making the melt into a film and stretching the film to 2.5 to 14 times the original area at least in the uniaxial direction.

1 Claim, No Drawings

RESIN COMPOSTION FOR POROUS FILM AND FILM PREPARED THEREFROM

BACKGROUND OF THE INVENTION

1. Field of the Invention

This invention relates to a resin composition for forming a porous film having a good water vapor permeability and air permeability and a superior water resistance and a porous film prepared therefrom.

2. Description of the Related Art

Porous films have so far been obtained by filling various non-compatible substances in polyolefin resins, making the resulting compositions into films and stretching the films (see Japanese patent publication No. Sho 53-12542/1978, U.S. Pat. No. 4,347,844 and Japanese patent application laid-open No. Sho. 57-59727/1982).

However, such films obtained according to these processes have such drawbacks that they are weak in the mechanical strengths, no uniform pore distribution is formed and they are too rigid, resulting in a less-flexible film. Thus, for example, as proposed in G.B. No. 2,151,538, the above problems have been improved by using barium sulfate as the non-compatible substance, but such use of barium sulfate is liable to cause clogging of the screen of extruder due to its flocking and also to lower the screen life and further to cause stretching breakage due to its flocks; hence such a process has not yet been satisfactory in the aspect of stabilized productivity. The screen life referred to herein will be defined in Examples.

SUMMARY OF THE INVENTION

An object of the present invention is to provide a resin composition which, when it is made into a porous film, makes the screen life prolong up to e.g. 200 hours or longer and scarcely causes stretching breakage to thereby stably produce a porous film having a good surface condition.

Another object of the present invention is to provide a porous film produced using the above resin composition.

The present invention in the first aspect resides in a resin composition comprising 100 parts by weight of a polyolefin resin and 50 to 500 parts by weight of barium sulfate having an electric conductivity of 250 $\mu$S/cm or less in terms of the electric conductivity of a supernatant formed when said barium sulfate is added to water, and a particle size of 0.1 to 7 $\mu$m.

The present invention in the second aspect resides in a porous film obtained by melting a resin composition comprising 100 parts by weight of a polyolefin resin and 50 to 500 parts by weight of barium sulfate having an electric conductivity of 250 $\mu$S/cm or less in terms of the electric conductivity of a supernatant formed when said barium sulfate is added to water, and a particle diameter of 0.1 to 7 $\mu$m, making the resulting melt into a film and at least uniaxially stretching the film to 2.5 to 14 times the original area.

DETAILED DESCRIPTION OR PREFERRED EMBODIMENTS

Examples of the polyolefin resins in the present invention are low density polyethylene, high density polyethylene (HDPE), linear low density polyethylene (LLDPE), homopolymers of propylene (PP), butylene, etc., ethylene-propylene copolymer, ethylene-butylene copolymer, ethylene-vinylacetate copolymer or blends thereof. Particularly, HDPE, LLDPE, PP and blends thereof are preferred.

The barium sulfate in the present invention is those having an electric conductivity of 250 ($\mu$S/cm) or less, preferably 100 ($\mu$S/cm) or less, and the lower the value, the better its effectiveness. If the electric conductivity of the barium sulfate exceeds 250 ($\mu$S/cm), the screen life is short due to the flocking of barium sulfate, stretching breakage occurs frequently, and the production stability becomes far inferior. Further, its average particle size is suitably 0.1 to 7 $\mu$m, preferably 0.5 to 5.0 $\mu$m. If the average particle size is less than 0.1 $\mu$m, no good porosity can be obtained, while if it exceeds 7.0 $\mu$m, the stretchability becomes inferior so that it is difficult to obtain a good porosity. In addition, a barium sulfate having a too large electric conductivity may be further washed with water or partially neutralized with an acid or a base, followed by washing with water, to thereby reduce the electric conductivity down to the one defined in the present invention, and then used.

In the resin composition of the present invention, the quantity of the barium sulfate blended is in the range of 50 to 500 parts by weight, preferably 100 to 400 parts by weight, based on 100 parts by weight of the polyolefin resin.

If the quantity thereof used is less than 50 parts by weight, no good porosity can be obtained, while it exceeds 500 parts by weight, the rigidity of the film increases so that no sufficient stretching can be carried out and the porosity is reduced.

The electric conductivity refers to a value obtained by introducing barium sulfate (10 g) in purified water (100 ml), followed by heating at 100° C. for 10 minutes, thereafter cooling and measuring the resulting supernatant by means of an electric conductivity meter.

The particle size of the barium sulfate referred to herein is measured by means of an instrument for measuring the powder surface area.

In addition, it is efffective for raising the dispersibility of barium sulfate in the resin and enhancing the stretchability to subject the barium sulfate to surface treatment with silicon, silane, resinic acid or the like.

The porous film of the present invention may be produced for example according to the following process:

Other additives usually used, if necessary, are blended with the above-mentioned polyolefin resin and barium sulfate, followed by mixing the resulting blend by means of Henschel mixer, super mixer or tumbling mixer, thereafter kneading the resulting mixture by means of a single- or twin-screw extruder, pelletizing the resulting material and making the resulting pellets into film by means of an inflation molding machine or a T-die molding machine. At that time, the above material may be directly made into film by means of an extruder without pelletizing it.

The resulting film is then at least uniaxially stretched to 2.5 to 14 times, preferably 3 to 10 times the original area according to conventional process. The stretching may be carried out in a divided multistage manner or in the biaxial direction or more. Further, after the stretching, heat setting may be carried out in order to increase the form stability of pores.

The porosity is determined depending on the quantity of the barium sulfate used, its particle size, the stretching ratio, etc., and if the stretching ratio is less than 2.5 times, no sufficient porosity can be obtained, while if it exceeds 14 times, stretching breakage occurs, so that stabilized production is impossible.

The porous film of the present invention can be used for various uses, but since the porosity may be varied in compliance with the use, it is preferred to adequately choose the stretching ratio.

As the indication for the porocity of the porous film, water vapor permeability mentioned later is employed.

The present invention will be described in more detail by way of Examples.

EXAMPLES 1-13 AND COMPARATIVE EXAMPLES 1-6

Various resins indicated in Table 1 and barium sulfate having various electric conductivity values and average particle diameters indicated in Table 1 were mixed in proportions indicated in Table 1 by means of Henschel mixer, followed by uniformly kneading the mixtures by means of a twin-screw kneader and, pelletizing the resulting materials.

The resulting pellets were melted and formed to films by means of a T-die extruder and the resulting films were stretched to the stretching times indicated in Table 1 according to a rolling process, physical properties of the films, obtained were indicated in Table 1.

In addition, the evaluations of the physical properties of the films were carried out according to the following methods:

(1) Water vapor permeability: According to the test procedure D in ASTM E96-66.

(2) Screen life: When film-making is carried out by means of an extruder of 115 mm, provided with a screen of 150 meshes, in a quantity of the resin composition extruded, of 200 kg/Hr, the period of until the resin pressure is elevated from 230 kg/cm$^2$ up to 300 kg/cm$^2$ is referred to as "screen life" herein.

(3) Surface condition: According to visible judgement.

(4) Electric conductivity of barium sulfate:

Its sample (10 g) is weighed and placed in a 200 ml beaker, followed by adding distilled water (100 ml), marking down to the position of the liquid surface, heating the mixture to 100° C. on an electric heater for 10 minutes with stirring, adding distilled water as far as the marked original position of the liquid surface, agitating the resultant, covering the beaker with a watch glass, allowing the liquid to cool down, filtering it with a filter paper, placing the filtrate in a 100 ml beaker and measuring its electric conductivity by means of an electric conductivity meter (CM-20E type (tradename of the meter manufactured by Toa Denpa Company)).

(5) Particle size of barium sulfate:

It is measured by means of an instrument for measuring the powder surface area (manufactured by Shimazu Seisakusyo), that is, by filling its sample (3 g) in a sample cylinder of 2 cm$^2$ × 1 cm and measuring the time of air permeation (5 cc) under 50 mm water pressure.

According to the present invention, since the flocking of barium sulfate which is a non-compatible substance, is little and the screen life is long, the operability is notably improved, the operation period of extruder is much prolonged and the stretchability is superior, so that it is possible to stably produce a porous film.

Further, a film having a very good surface condition and a far superior appearance is obtained.

Furthermore, since stretching up to 10 times which has so far been impossible has become possible, it is possible to adequately vary the porosity by adjusting the stretching ratio in accordance with the use object of the film to thereby choose the most useful film in accordance with its use application; thus the resin composition and the process for producing the same, of the present invention are commercially very useful.

TABLE 1

| | Resin | BaSO$_4$ Amount added phr | Electric conductivity μS/cm | Particle size μm | Stretching ratio | Water vapor permeability g/m$^2$ · 24 H | Screen life Hr | Surface condition |
| --- | --- | --- | --- | --- | --- | --- | --- | --- |
| Example | | | | | | | | |
| 1 | *$^1$LLDPE | 60 | 240 | 0.1 | 2.5 | 2000 | 250 | Good |
| 2 | " | 120 | 100 | 1 | 6 | 2500 | 350 | " |
| 3 | " | 400 | 50 | 6 | 10 | 2700 | 500 or more | " |
| 4 | " | 60 | 10 | 6 | 2.5 | 2100 | 500 or more | " |
| 5 | " | 120 | 240 | 1 | 6 | 2500 | 250 | " |
| 6 | " | 400 | 100 | 0.1 | 10 | 2400 | 350 | " |
| 7 | " | 60 | 50 | 1 | 10 | 2200 | 500 or more | " |
| 8 | " | 120 | 10 | 6 | 6 | 2200 | 500 or more | " |
| 9 | " | 400 | 240 | 0.1 | 2.5 | 2000 | 250 | " |
| 10 | " | 60 | 100 | 1 | 6 | 2200 | 350 | " |
| 11 | " | 120 | 50 | 0.1 | 2.5 | 2300 | 500 or more | " |
| 12 | *$^2$LDPE | 400 | 10 | 6 | 10 | 2700 | 500 or more | " |
| 13 | *$^3$PE-PP | 60 | 240 | 6 | 10 | 2400 | 250 | " |
| Comparative Example | | | | | | | | |
| 1 | LLDPE | 40 | 50 | 1 | 6 | 1000 | 500 or more | Somewhat good |
| 2 | " | 600 | 50 | 1 | 6 | Stretching breakage | Stretching breakage | — |
| 3 | " | 120 | 300 | 1 | 6 | 2500 | 180 | Bad |
| 4 | " | 120 | 50 | 10 | 6 | Stretching breakage | Stretching breakage | — |
| 5 | " | 120 | 50 | 1 | 15 | 2800 | Stretching breakage | — |
| 6 | " | 120 | 50 | 1 | 1.5 | 200 | 500 or more | Bad |

*$^1$LLDPE: Linear low density polyethylene (made by Mitsubishi Yuka Company)
*$^2$LDPE: Low density polyethylene (made by Mitsubishi Yuka Company)
*$^3$PE-PP: Ethylene-propylene copolymer (JSR-EP, tradename of product made by Japan Synthetic Rubbur Company)

What is claimed is:

1. A porous film obtained by melting a resin composition comprising 100 parts by weight of a polyolefin resin and 50 to 500 parts by weight of barium sulfate having an electric conductivity of 250 $\mu$S/cm or less in terms of the electric conductivity of a supernatant formed when said barium sulfate is added to water, and a particle size of 0.1 to 7 $\mu$m, making the resulting melt into a film and stretching the film to 2.5 to 14 times the original area at least in the uniaxial direction.

* * * * *